United States Patent Office 3,160,594
Patented Dec. 8, 1964

3,160,594
POLYMERIZATION OF HYDROCYANIC ACID
Hans Herzog, Konstanz, Germany, assignor to Deutsche Gold- und Silber-Scheideanstalt vormals Roessler, Frankfurt am Main, Germany
No Drawing. Filed Mar. 2, 1962, Ser. No. 176,908
Claims priority, application Germany, Mar. 9, 1961, D 35,596
6 Claims. (Cl. 260—1)

The present invention relates to the polymerization of hydrocyanic acid with an improved polymerization accelerator.

It is known that the polymerization of liquid hydrocyanic acid containing at least traces of water or aqueous solutions of hydrocyanic acid can be accelerated catalytically with the aid of basic reacting substances, such as ammonium, alkali metal or alkaline earth metal hydroxides, or, respectively, their cyanides. In general, it is necessary to maintain a pH above 3 for such polymerization. It is also known that gaseous hydrogen cyanide or hydrogen cyanide diluted with an inert gas polymerizes in the presence of small quantities of ammonia. The polymerization products produced are light brown to black products useful for various purposes, such as, for example, separating metal salts from aqueous solutions.

The polymerization is influenced by the concentration of the alkali and attempts to carry out the alkaline polymerization under optimum conditions have not been lacking. For example, cyanates which in themselves act catalytically have been employed as accelerators in conjunction with the above indicated hydroxides and cyanides to increase the velocity of the polymerization. With equimolar concentrations it was possible to increase the polymerization velocity about 5 fold.

According to the invention it was found that the polymerization of liquid hydrocyanic acid containing small amounts of water, that is, hydrocyanic acid containing at least traces of water or preferably aqueous solutions of hydrocyanic acid in the presence of an alkaline catalyst can be carried out especially well if such polymerization is carried out in the presence of a vanadate in which the vanadium is pentavalent as an accelerator. Preferably, the pentavalent vanadate is added as such to the polymerization medium but it is also possible to introduce the vanadium in such a form that the pentavalent stage is only formed within the polymerization medium. The pentavalent vanadates substantially increase the velocity of polymerization of hydrocyanic acid in the presence of basic catalysts such as ammonium, alkali metal or alkaline earth metal hydroxides and/or cyanides and/or cyanates. This is especially so when the vanadate employed is highly soluble in water. In comparison to the cyanates previously employed as accelerators, the vanadates can be employed in high concentrations which are only limited by their solubility in the polymerization solution. This renders it possible to increase the velocity of the polymerization still further. As the vanadates are not consumed during the polymerization high concentrations are also feasible on large scale technical operations without placing the economy of the process in jeopardy.

Ortho-, meta-, di-, pentavanadates as well as salts of polyvanidic acids which form vanadates of pentavalent vanadium in aqueous solution can be employed in the process of the invention. The metavanadates and especially the alkali metal metavanadates are preferably employed. Expediently the ratio of vanadates to hydrocyanic acid employed is from 1:20 to 1:6.

The polymerization products are capable of reversibly taking up metal salts, especially noble metal salts in high concentrations. As a consequence they can be used for recovering such salts from aqueous solutions. In addition, they can be used as nitrogen containing fertilizers.

The following examples will serve to illustrate the process according to the invention:

Example 1

4.5 mol of sodium cyanide and 0.6 mol of sodium metavanadate were dissolved in 1000 cc. of water and introduced into a reaction vessel provided with a reflux condenser. Then 12 mol of hydrocyanic acid were added to such solution which quickly thereafter turned brownish black. After 40 minutes condensation of hydrocyanic acid in the reflux condenser ceased and the temperature in the vessel dropped. The reaction had ended at this time and the resulting polymer was filtered off and washed. The yield was 94%.

Example 2

4.5 mol of sodium cyanide and 0.3 mol of sodium metavanadate were dissolved in 1000 cc. of water and introduced into a stirring vessel provided with a reflux condenser. Then 12 mol of hydrocyanic acid were added to such solution which quickly thereafter turned brownish black. The reaction ended in 57 minutes which was signified by cessation of condensation of hydrocyanic acid in the reflux condenser and a drop in the temperature in the stirring vessel. The resulting polymer was filtered off and washed. The yield was 95%.

Example 3

In comparison the procedure of Examples 1 and 2 was repeated but with omission of the accelerator, sodium metavanadate. In this case the solution after addition of the hydrocyanic acid gradually became yellow and only turned brownish black after 150 minutes. At this point no further hydrocyanic acid condensed in the reflux condenser and the temperature in the reaction vessel dropped. The yield was only 86%.

The polymerization can be carried out at a temperature between 20° C. and the boiling temperature of the solution. When the polymerization is carried out under pressure, even higher temperatures can be used. The preferred range is between 50° and 60° C.

The concentration of the alkaline catalyst lies between small but catalytically effective amounts and the saturation of the solution.

Examples of the vanadates which may be used are:

Na (3:1) vanadate
Na (2:1) vanadate
Na (1:1) vanadate
Na (1:2) vanadate
Na (1:3) vanadate K (3:1) vanadate
K (2:1) vanadate
K (1:1) vanadate
K (1:2) vanadate
K (1:3) vanadate

I claim:

1. In a process for the liquid phase polymerization of hydrocyanic acid in contact with water and an alkaline catalyst, the step which comprises carrying out such polymerization in contact with an alkali metal vanadate in which the vanadium is pentavalent under reflux, the molar ratio of vanadate to hydrocyanic acid employed being from 1:20 to 1:6.

2. The process of claim 1 in which the vanadate is a metavanadate.

3. The process of claim 1 in which the vanadate is sodium metavanadate.

4. The process of claim 1 in which said vanadate is in aqueous solution.

5. The process of claim 4 in which said vanadate is a 3:1 to 1:3 sodium vanadate.

6. The process of claim 4 in which said alkaline catalyst is selected from the group consisting of ammonium, alkali metal and alkaline earth metal hydroxides, cyanides and cyanates.

References Cited by the Examiner

UNITED STATES PATENTS 2,894,916  7/59  Burleson _____ 260—2

MURRAY TILLMAN, *Primary Examiner.*

J. R. LIBERMAN, *Examiner.*